(12) United States Patent
Batty

(10) Patent No.: US 8,365,427 B2
(45) Date of Patent: Feb. 5, 2013

(54) GRINDING ANGLE GAUGE AND HOLDER

(76) Inventor: Stuart Batty, Boulder, CO (US)

( * ) Notice: Subject to any disclaimer, the term of this patent is extended or adjusted under 35 U.S.C. 154(b) by 0 days.

(21) Appl. No.: 13/454,079

(22) Filed: Apr. 23, 2012

(65) Prior Publication Data

US 2012/0266473 A1  Oct. 25, 2012

Related U.S. Application Data

(60) Provisional application No. 61/478,331, filed on Apr. 22, 2011.

(51) Int. Cl.
  *B27G 23/00*   (2006.01)
  *G01B 3/56*   (2006.01)

(52) U.S. Cl. ............... 33/534; 33/1 N; 33/628

(58) Field of Classification Search .............. 33/534, 33/1 N, 628, 640, 641, 562, 501.45, 563, 33/565, 482
See application file for complete search history.

(56) References Cited

U.S. PATENT DOCUMENTS

| | | | | |
|---|---|---|---|---|
| 434,073 | A * | 8/1890 | Rondinella | 33/474 |
| 685,372 | A | 10/1901 | Duncan | |
| 728,558 | A * | 5/1903 | Eldridge | 33/451 |
| 1,672,695 | A * | 6/1928 | Simpson | 33/456 |
| 2,579,857 | A * | 12/1951 | Premo | 33/476 |
| 2,593,914 | A * | 4/1952 | Palitto | 33/482 |
| 3,252,223 | A * | 5/1966 | Gettel | 33/534 |
| 4,262,649 | A | 4/1981 | Espinosa | |
| 4,442,606 | A | 4/1984 | Graham et al. | |
| 4,976,046 | A * | 12/1990 | Lee et al. | 33/640 |
| D313,762 | S | 1/1991 | Chan | |
| 5,172,484 | A | 12/1992 | Triola | |
| 5,201,783 | A * | 4/1993 | Peters | 33/474 |
| 5,937,371 | A | 8/1999 | Gruetzmacher | |
| 6,237,238 | B1 | 5/2001 | Shapiro | |
| D450,607 | S | 11/2001 | Tomiser | |
| 6,510,618 | B2 * | 1/2003 | Tomiser et al. | 33/534 |
| 6,536,124 | B1 | 3/2003 | Eskew | |
| 6,766,584 | B1 * | 7/2004 | Reilly | 33/534 |
| 7,210,237 | B1 | 5/2007 | Shih | |
| 7,305,773 | B2 * | 12/2007 | Hios et al. | 33/429 |
| 7,487,599 | B1 * | 2/2009 | Spirito | 33/640 |
| 7,513,057 | B2 | 4/2009 | Robinson | |
| 7,934,322 | B2 | 5/2011 | Wixey | |
| D657,273 | S | 4/2012 | Krohmer | |
| 2010/0248594 | A1 | 9/2010 | Nish | |

FOREIGN PATENT DOCUMENTS

| | | |
|---|---|---|
| CN | 201359477 | 12/2009 |
| DE | 202006003540 | 6/2006 |
| EP | 2420795 A1 | 2/2012 |
| FR | 2226821 | 11/1974 |
| FR | 2935923 A1 | 12/2008 |
| GB | 2250101 A | 5/1992 |
| GB | 2378256 A | 5/2003 |
| JP | 2000002502 A | 5/1999 |
| JP | 2004268211 A | 9/2004 |

* cited by examiner

*Primary Examiner* — Christopher Fulton
(74) *Attorney, Agent, or Firm* — Mark Hunziker

(57) ABSTRACT

An angle gauge comprising multiple surfaces around its perimeter, each of which provides for two or more fixed sharpening angles; each angle incorporating angular compensation for workpiece thickness and variations in peripheral grinding wheel diameter in order to quickly and accurately set an angular relationship between an curved or planar abrasive surface and a tool rest. The angle gauge has no moving or adjustable parts and is separate from both the grinder and the tool rest. The angle gauge may also be attached to a holder allowing for angle setup when the workpiece cannot be supported by a platform or tool rest.

10 Claims, 8 Drawing Sheets

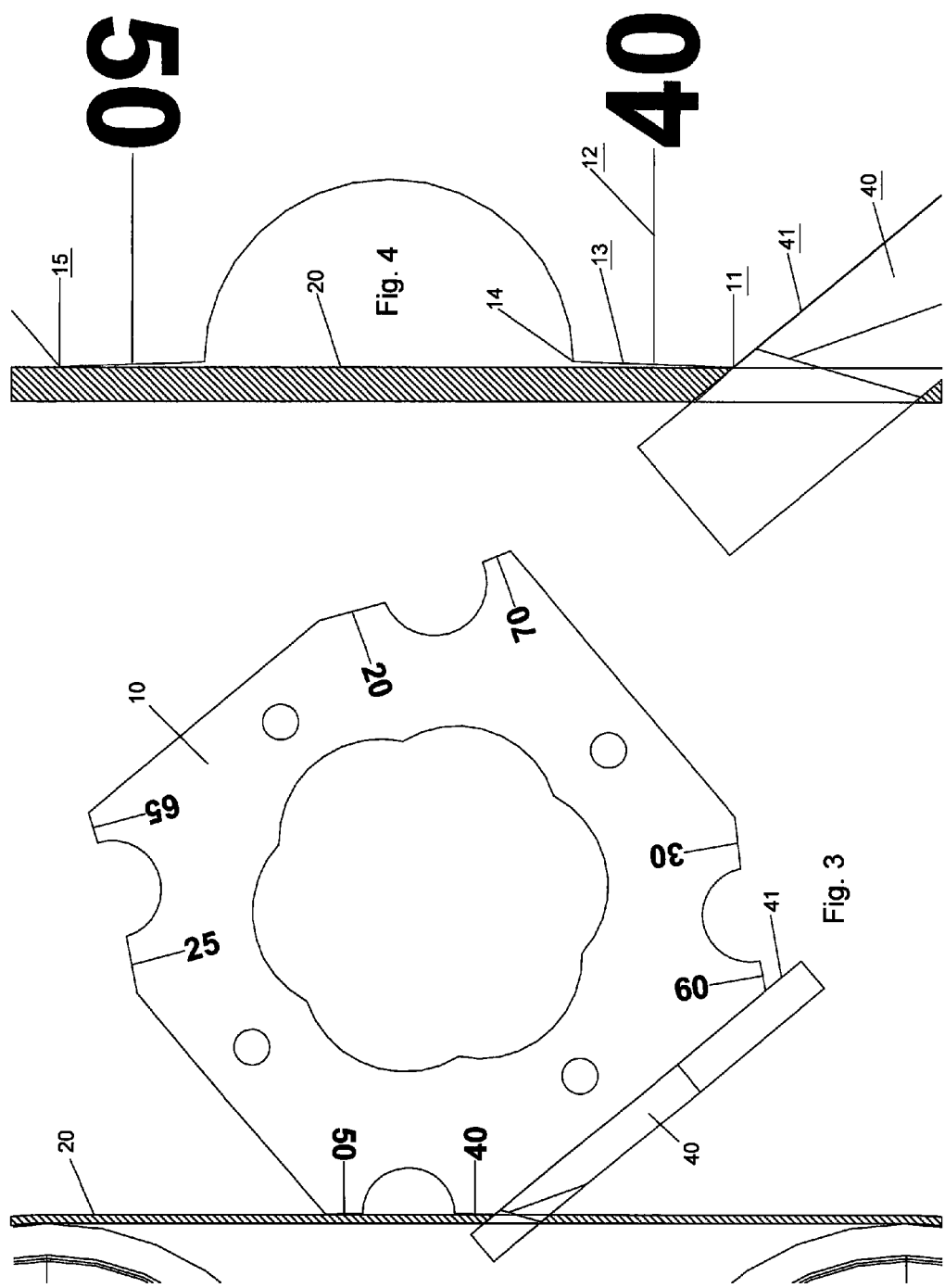

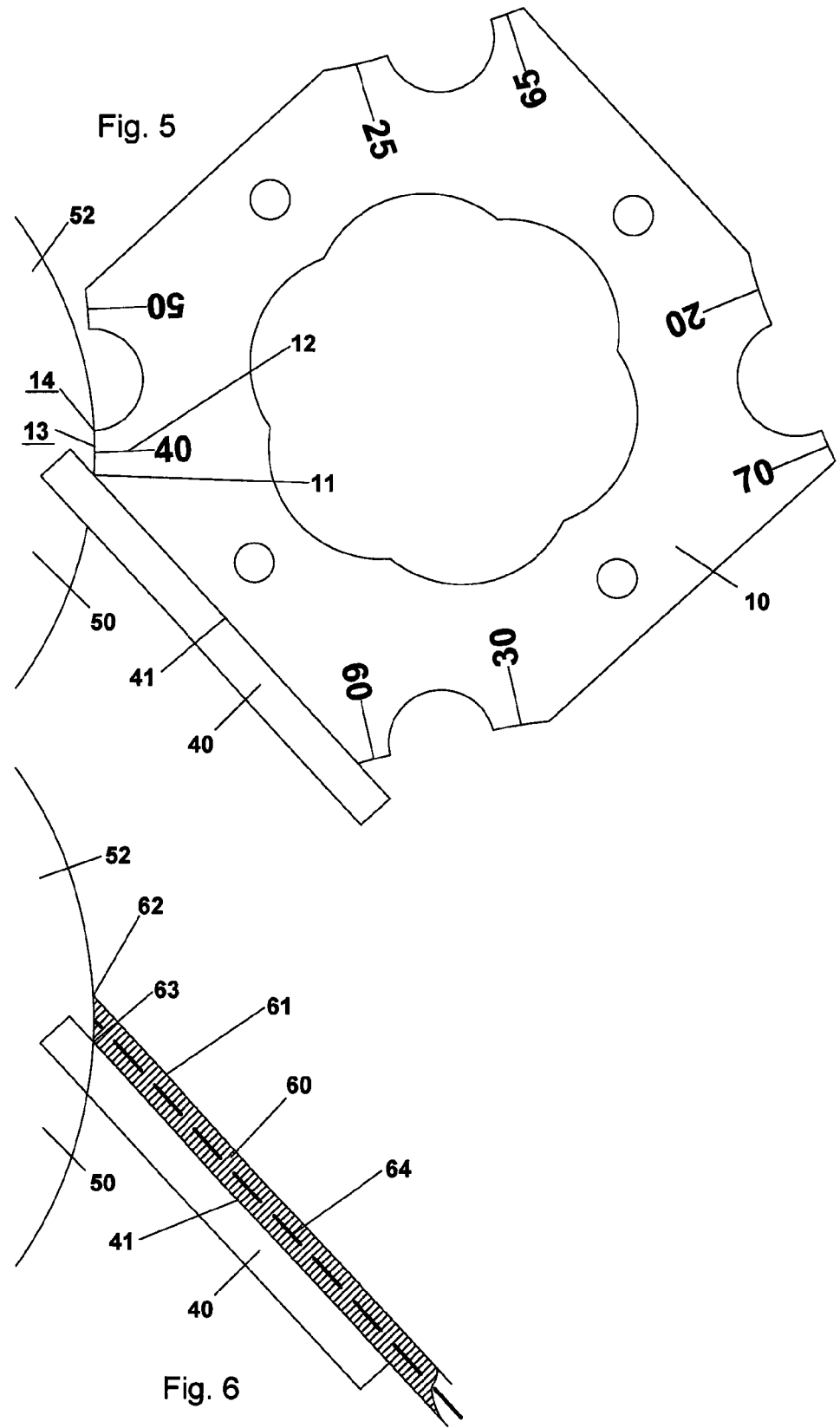

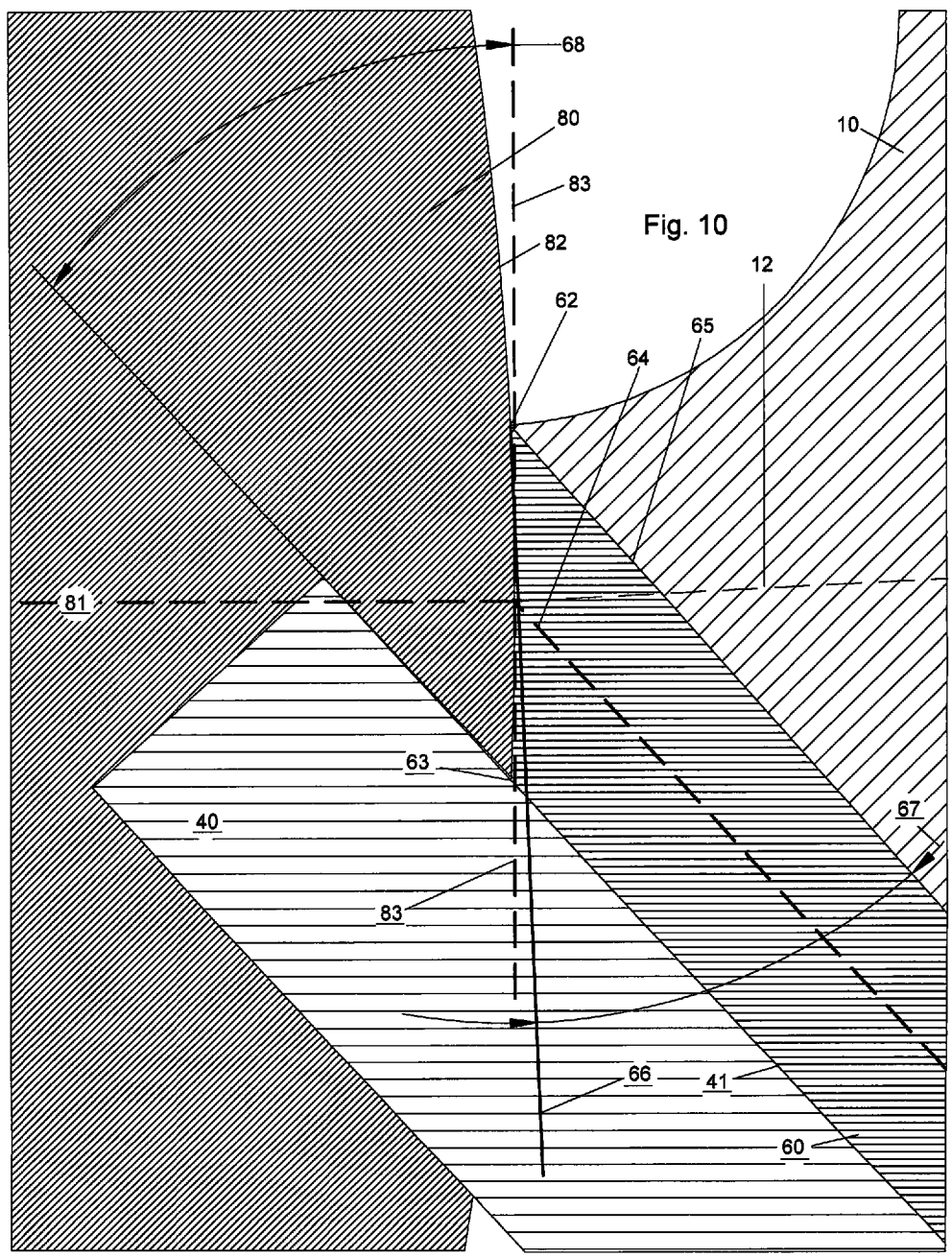

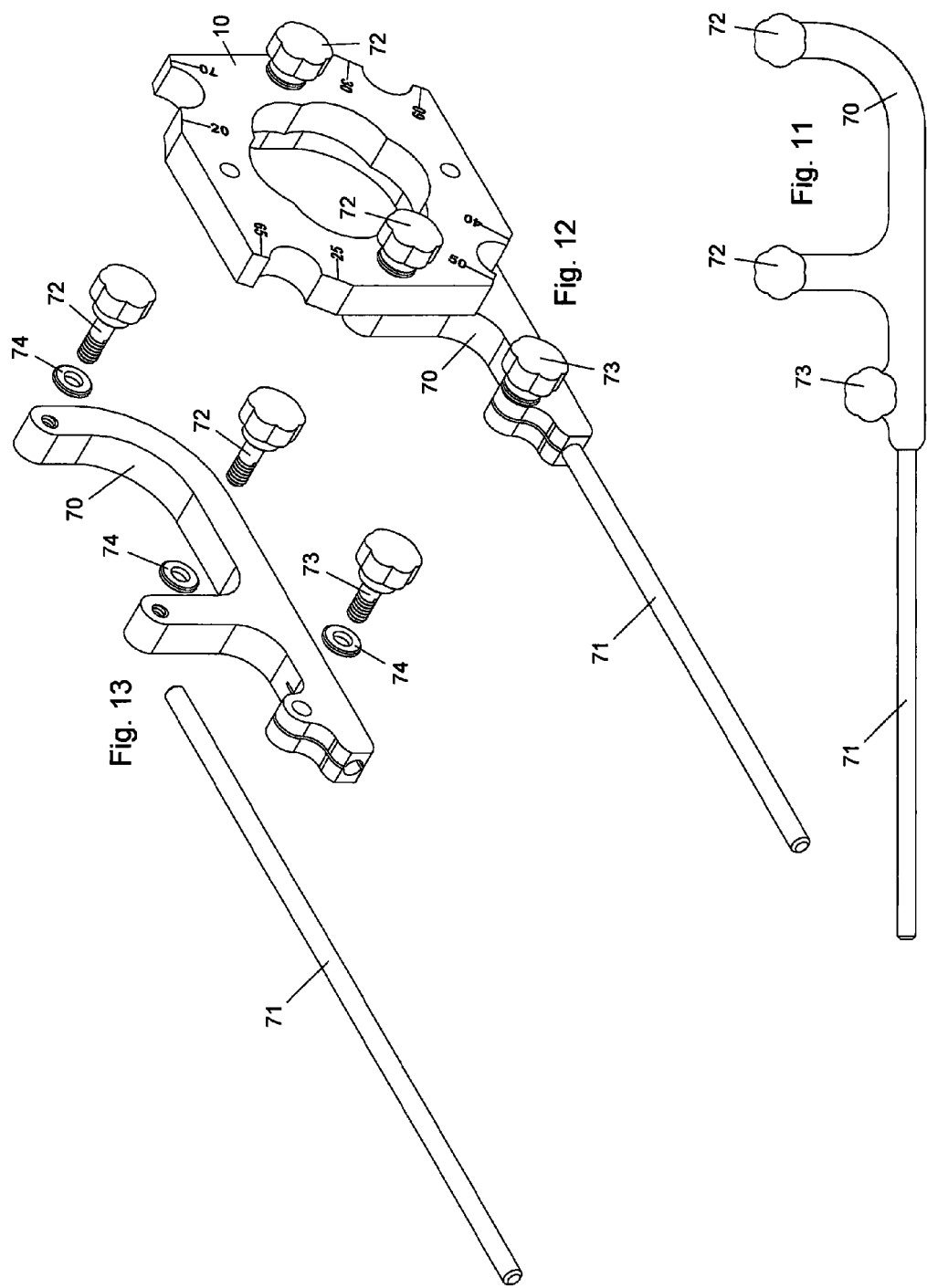

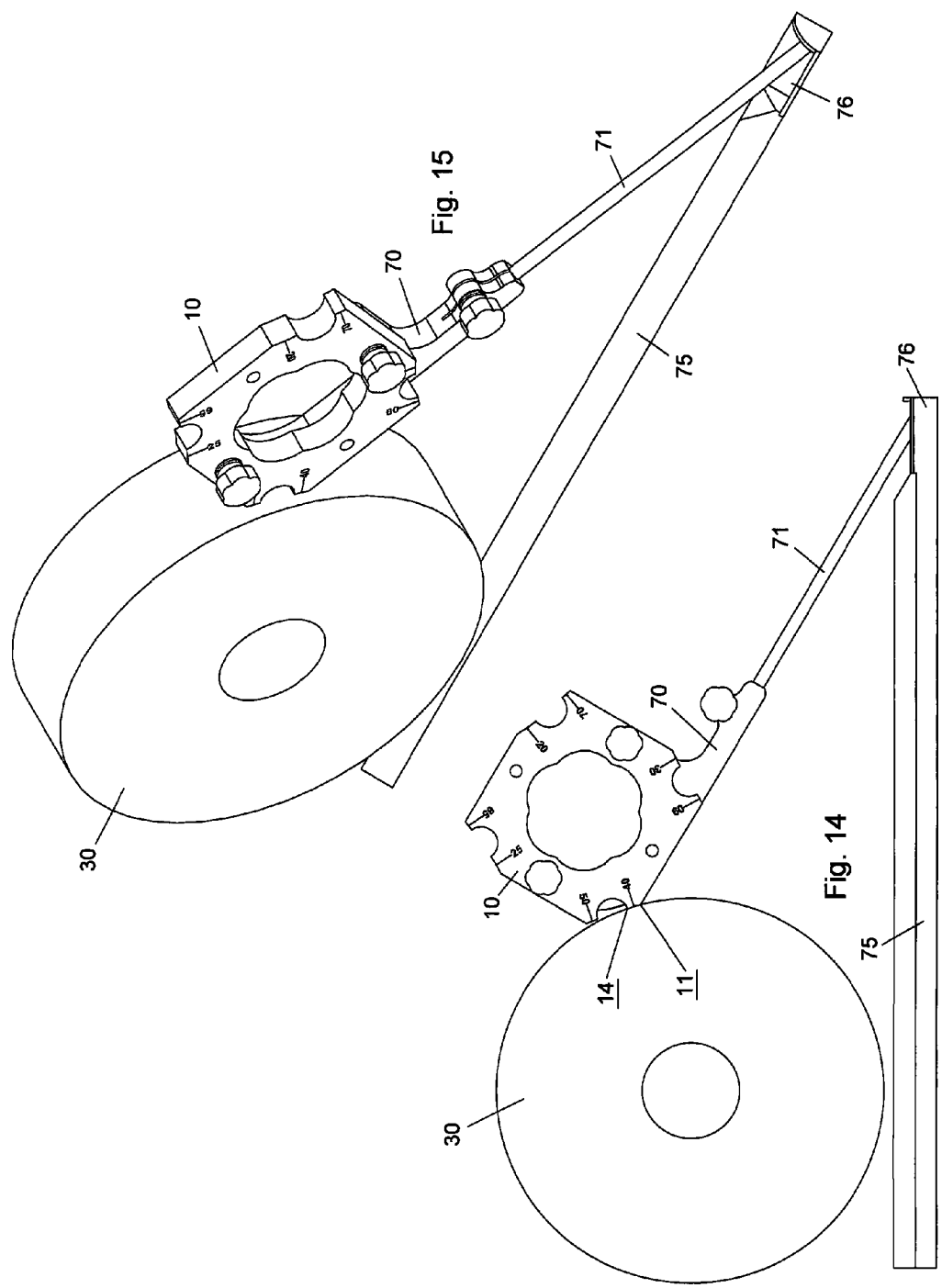

GRINDING ANGLE GAUGE AND HOLDER

CROSS REFERENCE TO RELATED APPLICATIONS

This application claims the benefit of U.S. Provisional Patent Application No. 61/478,331, filed on Apr. 22, 2011, which is incorporated by reference herein in its entirety for all purposes.

BACKGROUND OF THE INVENTION

1. Field of the Invention

Embodiments of the present invention relate to a separate measuring device used to define the angular relationship between a flat or curved peripheral surface such as an abrasive belt or a grinding wheel and another peripheral surface or tool such as a grinding platform, a tool rest, or a woodworking tool.

2. Description of Related Art

Angle gauges are commonly used to determine the angle between a grinder or belt sander and a tool rest when sharpening metal tools, or between any two surfaces when the angle between the surfaces needs to be determined with precision. The following discussion will focus on sharpening woodworking tools; however, this invention is not limited to sharpening tools.

Sharpening woodworking tools is typically accomplished by resting the tool on the grinder platform such that the longitudinal axis of the tool is parallel to the plane created by the top of the platform surface; the tool is then pressed toward the abrasive surface by hand. Employing this hand-held method requires a tool platform that adequately supports the workpiece as well as having the platform set to the correct angle and position to obtain the desired angle of the sharpened edge of the workpiece.

Longer woodworking tools, such as woodturning tools, make use of a conventional grinding platform inconvenient because the center of gravity of the woodturning tool is typically not resting on the platform; because of this, it is common to secure the rear of woodturning tools with an extensible work rest such that the height and distance of the rear of the workpiece from the grinding surface determines the angle of the intersection of the edge to be sharpened with the surface of the grinder.

It is fairly common for grinder platforms to incorporate a fixture to assist with making angular measurements between the grinding platform and the abrasive surface. A problem common to such fixtures is that they measure the angle of surface of the platform in relation to the grinder, not the angle of the tip the workpiece placed upon the grinding platform, which is where the true angle of the edge of the workpiece is created. The angle created on the tip of the workpiece becomes increasing inaccurate with grinding wheels because they vary in diameter over time due to wear and attrition while a fixed tool rest typically does not compensate for this; additionally, platform fixtures cannot be used to gauge the angle on more than one grinder.

There are several methods commonly used to determining the variable angular relationship between a curved grinding surface and a grinding platform that do not incorporate the use of a fixed grinder platform angle gauge. Common methods include: simply grinding the workpiece and measuring the resulting angle of the sharpened workpiece; preparing blocks of wood, called jigs, with the desired angles preset on one of their edges; placing a protractor on the grinding platform and along the side of the grinding wheel; or placing a digital angle gauge on the platform. All of these methods can be adapted to work with longer workpieces.

While the proceeding methods work, they are all slow: the trial and error of grinding first and measuring later is time consuming; as is sorting through numerous pre-cut jigs to find the right angle; while placing a protractor along the side of a grinding wheel requires time to place it in the correct location; and digital angle gauges must either be preset to the right angle or the tool rest must be held carefully while the angle of the rest is set.

Embodiments of the present invention overcomes this shortcoming by allowing most of the commonly used angles needed for sharpening woodworking tools to be set by glancing at the angle gauge, placing it on the tool rest, and adjusting the tool rest snugly to the angle gauge without sorting through jigs, bending over to view and angle, or setting an angle on the gauge. Additionally, unlike the commonly used methods, the present invention incorporates angular compensation for workpiece thickness and variations in grinding wheel diameter. This angle gauge can also be attached to a holder that allows for accurate measurement of the angle of longer workpieces where platform tool rests cannot be used.

SUMMARY

According to embodiments of the present invention; this invention comprises an angle gauge having multiple surfaces around its perimeter, each of which provides for two or more fixed sharpening angles; each angle incorporating angular compensation for workpiece thickness and variations in peripheral grinding wheel diameter in order to quickly and accurately set an angular relationship between an abrasive wheel or belt and a tool rest. The angle gauge has no moving or adjustable parts and is separate from both the grinder and the tool rest. The angle gauge may also be attached to a holder allowing for angle setup when the workpiece is supported by a telescoping receiver.

Embodiments of this invention also encompass a method for using the angle gauge to set many preset angles by placing the angle gauge on the platform so that the desired preset angle, as determined by a marking, is located closest to the angle to be set; and moving the platform so that the angle of the platform and abrasive surface matches the preset angle of the gauge.

In another embodiment, the angle gauge is used in conjunction with an angle gauge holder to establish the desired grinding angle in the absence of a tool rest platform. Under these circumstances the positioning shaft of the holder assembly is placed into the receiver of a telescoping workpiece holder commonly used for sharpening woodturning tools.

While multiple embodiments are disclosed, still other embodiments of the present invention will become apparent to those skilled in the art from the following detailed description which shows and describes illustrative embodiments of the invention. Accordingly, the drawings and detailed description are to be regarded as illustrative in nature and not restrictive.

OBJECTS AND ADVANTAGES

None of the particular objects or advantages that follow must be entirely satisfied as they are non-exclusive alternatives and at least one of the following objects is met; accordingly, several objects and advantages of the present invention are:

(a) to provide an angle gauge with multiple preset angles around its perimeter;

(b) to provide an angle gauge with preset angles that accurately sets the angle to be grinded upon a workpiece when using a platform and a curved or planar abrasive surface;

(c) to provide an angle gauge that compensates for workpiece thickness;

(d) to provide an angle gauge that compensates for variable grinding wheel diameter;

(e) to provide an angle gauge capable of setting many preset angles by placing the angle gauge on the platform so that the desired preset angle, as determined by a marking, is located closest to the angle to be set; and moving the platform so that the angle of the platform and abrasive surface matches the preset angle of the gauge;

(f) to provide an angle gauge that has no moving parts and requires no calculations;

(g) to provide an angle gauge used in conjunction with an angle gauge holder to establish the desired grinding angle in the absence of a tool rest platform;

(h) these and other objects and advantages of the invention will be apparent from the detailed description and drawings.

BRIEF DESCRIPTION OF THE DRAWINGS

1. Figures

FIG. 3 (on Sheet 2) illustrates a side view of an angle setup gauge 10 on a tool rest platform 40 in conjunction with a planar abrasive 20 according to embodiments of the present invention.

FIG. 4 (on Sheet 2) illustrates a close-up side view of an angle setup gauge on a tool rest platform 40 in conjunction with the planar abrasive 20 according to embodiments of the present invention.

FIG. 5 (on Sheet 3) illustrates a side view of an angle setup gauge 10 on a tool support platform 40 in conjunction with a smaller diameter straight wheel 50 of a peripheral style grinder according to embodiments of the present invention.

FIG. 6 (on Sheet 3) illustrates a side view of a grinding platform 40 supporting a workpiece 60 in conjunction with a smaller diameter straight wheel 50 of a peripheral style grinder according to embodiments of the present invention.

FIG. 10 (on Sheet 6) illustrates a close-up side view of a grinding platform 40 supporting a workpiece 60 in conjunction with a larger diameter straight wheel 80 of a peripheral style grinder according to embodiments of the present invention.

FIG. 11 (on Sheet 7) illustrates a side view of a setup gauge holder for an angle setup gauge 10 according to embodiments of the present invention.

FIG. 12 (on Sheet 7) illustrates an isometric view of a setup gauge assembly according to embodiments of the present invention.

FIG. 13 (on Sheet 7) illustrates an exploded isometric view of a setup gauge holder according to embodiments of the present invention.

FIG. 14 (on Sheet 8) illustrates a left side view of a holder assembly for an angle setup gauge 10 in conjunction with a generic adjustable tool positioning arm 75 according to embodiments of the present invention.

FIG. 15 (on Sheet 8) illustrates an isometric perspective view of a holder assembly for an angle setup gauge 10 in conjunction with a generic adjustable tool positioning arm 75 according to embodiments of the present invention.

2. References

Figure 1:
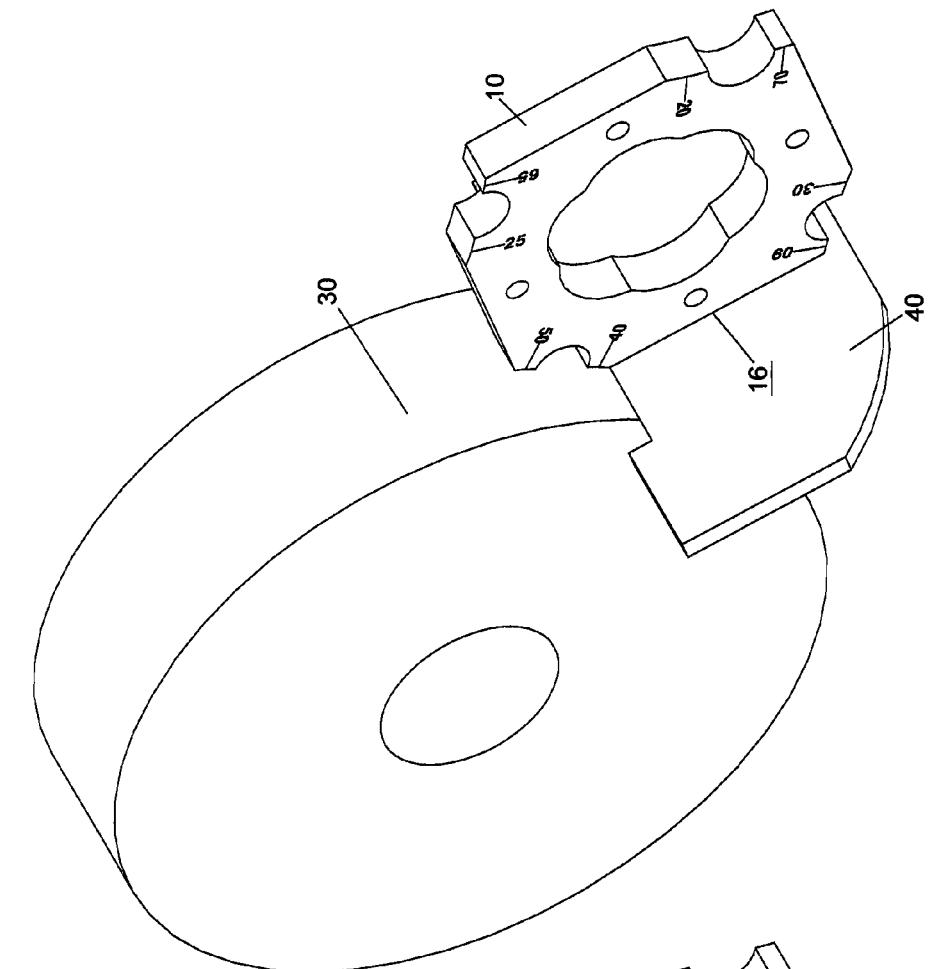
FIG. 1 (on Sheet 1) illustrates an isometric perspective view of an angle setup gauge 10 on a tool rest platform 40 in conjunction with a planar abrasive 20 according to embodiments of the present invention.

10 Angle setup gauge.
   11 Lower horizontal edge of setup gauge lower abrasive contact face.
   12 Centerline marker of lower abrasive contact face.
   13 Left side vertical edge of setup gauge lower abrasive contact face.
   14 Upper horizontal edge of setup gauge lower abrasive contact face.
   15 Upper horizontal edge of setup gauge upper abrasive contact face.
   16 Edge of gauge platform contact face.
   20 Planar abrasive surface.
   30 Curved abrasive surface.
   40 Tool rest platform.
   41 Plane of the tool rest platform upper face.
   50 Smaller diameter abrasive cylinder.
   51 Horizontal radius line of a smaller diameter abrasive cylinder.
   52 Cylindrical surface of a smaller diameter abrasive cylinder.
   53 Vertical tangent line of a smaller diameter abrasive cylinder.
   60 Workpiece being ground.
   61 Upper surface of workpiece thickness.
   62 Intersection of the upper surface of a workpiece and an abrasive surface.
   63 Intersection line of the lower surface of a workpiece and an abrasive surface.
   64 Midline of the thickness of a workpiece.
   65 Workpiece thickness.
   66 Tangent line to the abrasive cylindrical surface 52 or 82 at the intersection 62 of a workpiece upper surface 61 and an abrasive surface 52 or 82.
   67 Wedge angle of a ground edge.
   68 Vertical angle between the vertical tangent at the workpiece midline and a workpiece platform plane 41.
   70 Setup gauge holder body.
   71 Positioning shaft for setup gauge holder.
   72 Setup gauge mounting screws.
   73 Clamping screw for a positioning shaft for a setup gauge holder.
   74 Washers.
   75 Adjustable tool positioning arm.
   76 Retaining bracket of an adjustable tool positioning arm.
   80 Larger diameter abrasive cylinder.

81 Horizontal radius line of a larger diameter abrasive cylinder.
82 Cylindrical surface of a larger diameter abrasive cylinder.
83 Vertical tangent line of a larger diameter abrasive cylinder.

DETAILED DESCRIPTION OF A PREFERRED EMBODIMENT

For the purposes of promoting an understanding of the principles of the invention, reference will now be made to the embodiments illustrated in the drawings and specific language will be used to describe the same. However, the illustrated embodiments are merely exemplary and many additional embodiments of this invention are possible. For example, a grinder is pictured; however, this invention could be used to measure angles between any two flat planes or single flat plane and a curved plane. It is understood that no limitation of the scope of the invention is thereby intended. Any alterations and further modifications in the illustrated devices, and such further application of the principles of the invention as illustrated herein are contemplated as would normally occur to one skilled in the art to which the invention relates.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIGS. 1 through 4

Figure 2:
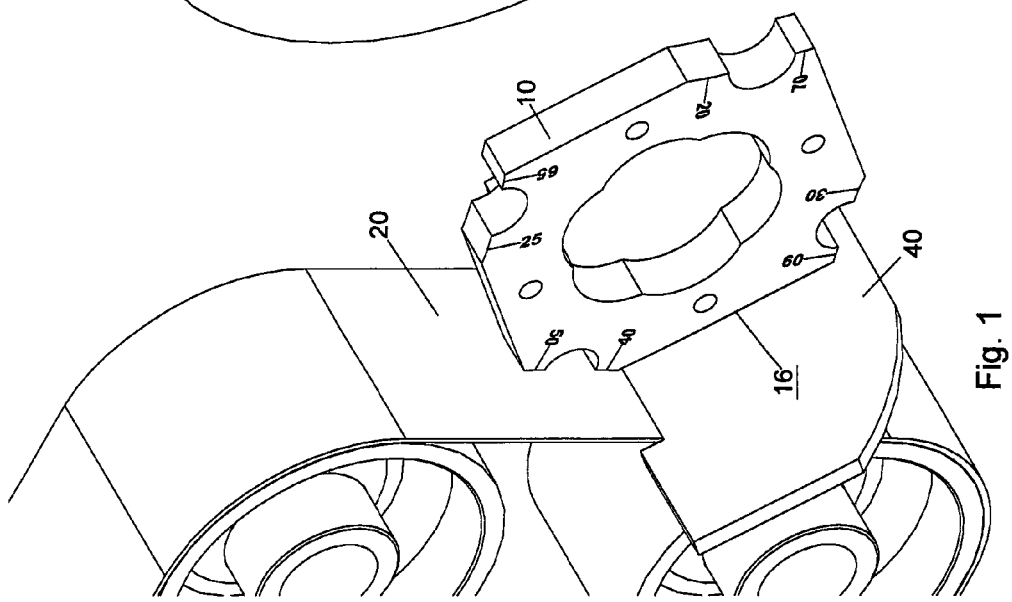
FIG. 2 (on Sheet 1) illustrates an isometric perspective view of an angle setup gauge 10 on a tool rest platform 40 in conjunction with a cylindrical abrasive 30 according to embodiments of the present invention.

FIG. 1 illustrates an isometric perspective view of a setup gauge 10 as used in conjunction with a planar abrasive surface. The angle setup gauge 10 can be machined from a highly durable material such as aluminum, hardened plastic, or any other suitable material known in the art. FIG. 2 illustrates an isometric perspective view of a grinding angle setup gauge 10 as used in conjunction with a curved abrasive surface 30. FIG. 3 illustrates a side view of a grinding angle setup gauge 10 as used in conjunction with a planar abrasive surface 20. FIG. 4 also illustrates a close-up side view of a grinding angle setup gauge 10 as used in conjunction with a planar abrasive surface.

Operation of FIGS. 1 through 4

The use of the grinding angle setup gauge 10 in conjunction with a planar abrasive surface 20 is a simple application. As seen in FIG. 4, the angle gauge 10 is placed on the tool rest platform 40 with the chosen perimeter abrasive contact face in position for setting that chosen angle. The angle to be set is easily chosen by reference to a centerline marker 12 for the abrasive face which extends from the lower abrasive contact face 13. In another embodiment, the angle could be indicated from another position than the centerline marker, such as a representative number located in the appropriate corner. In this instance, 40 degrees is the chosen angle. The angle of the tool rest platform 20 is then adjusted until both the horizontal edge of the setup gauge lower abrasive contact face 11 and the upper horizontal edge of the setup gauge upper abrasive contact face 15 make contact with the planar abrasive surface 20 while the gauge platform contact face rests flat on the tool rest platform 40. When this has been achieved the desired grinding angle has been set. Similarly, all the angles displayed on the face of the grinding angle setup gauge 10 can be established just as easily. In addition, the gauge can be manufactured with other angles should those be desired by the user.

FIGS. 5 through 10

Figure 7:
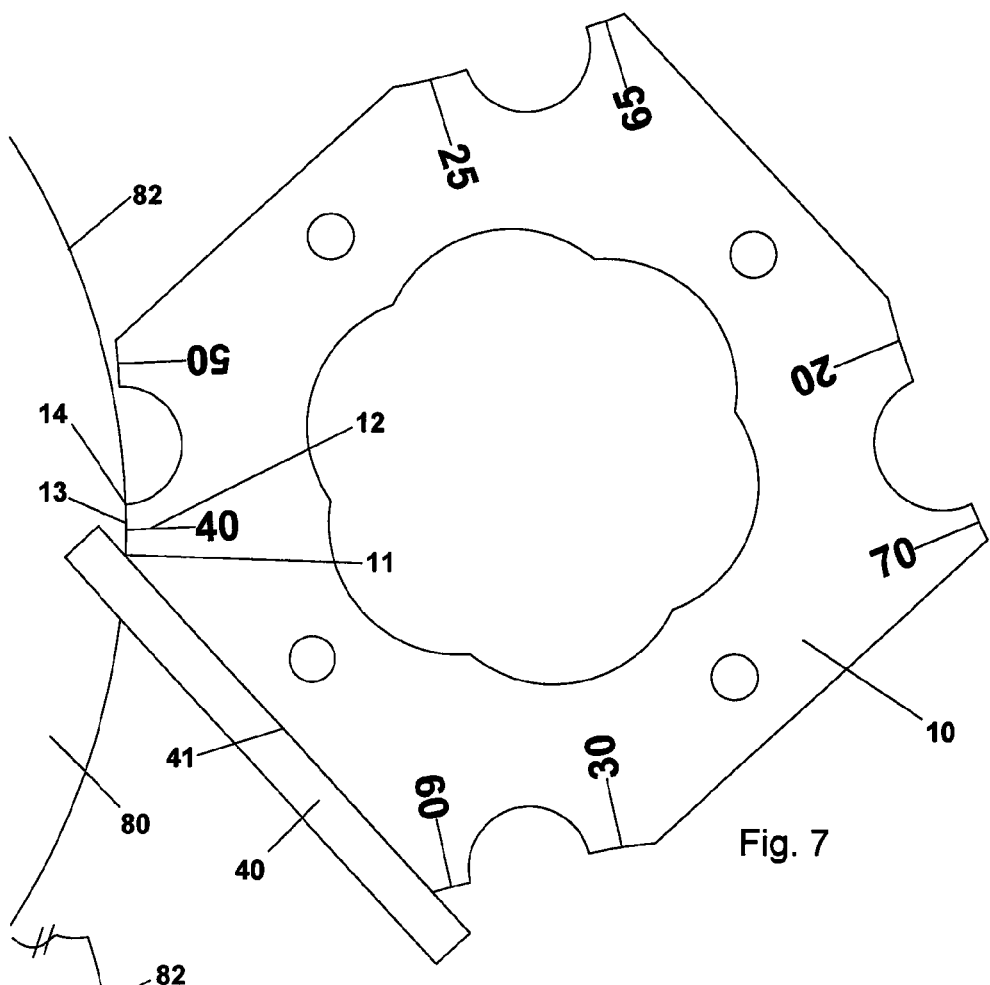
FIG. 7 (on Sheet 4) illustrates a side view of an angle setup gauge 10 on a tool support platform 40 in conjunction with a larger diameter straight wheel 80 of a peripheral style grinder according to embodiments of the present invention.
Figure 8:
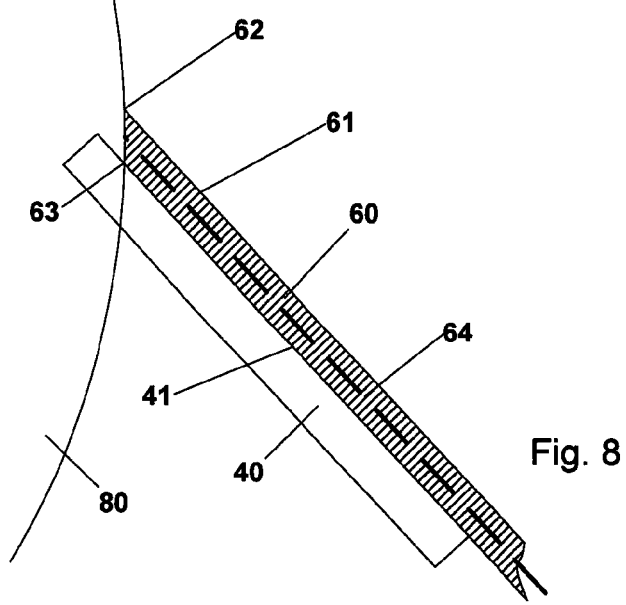
FIG. 8 (on Sheet 4) illustrates a side view of a grinding platform 40 supporting a workpiece 60 in conjunction with a larger diameter straight wheel 80 of a peripheral style grinder according to embodiments of the present invention.
Figure 9:
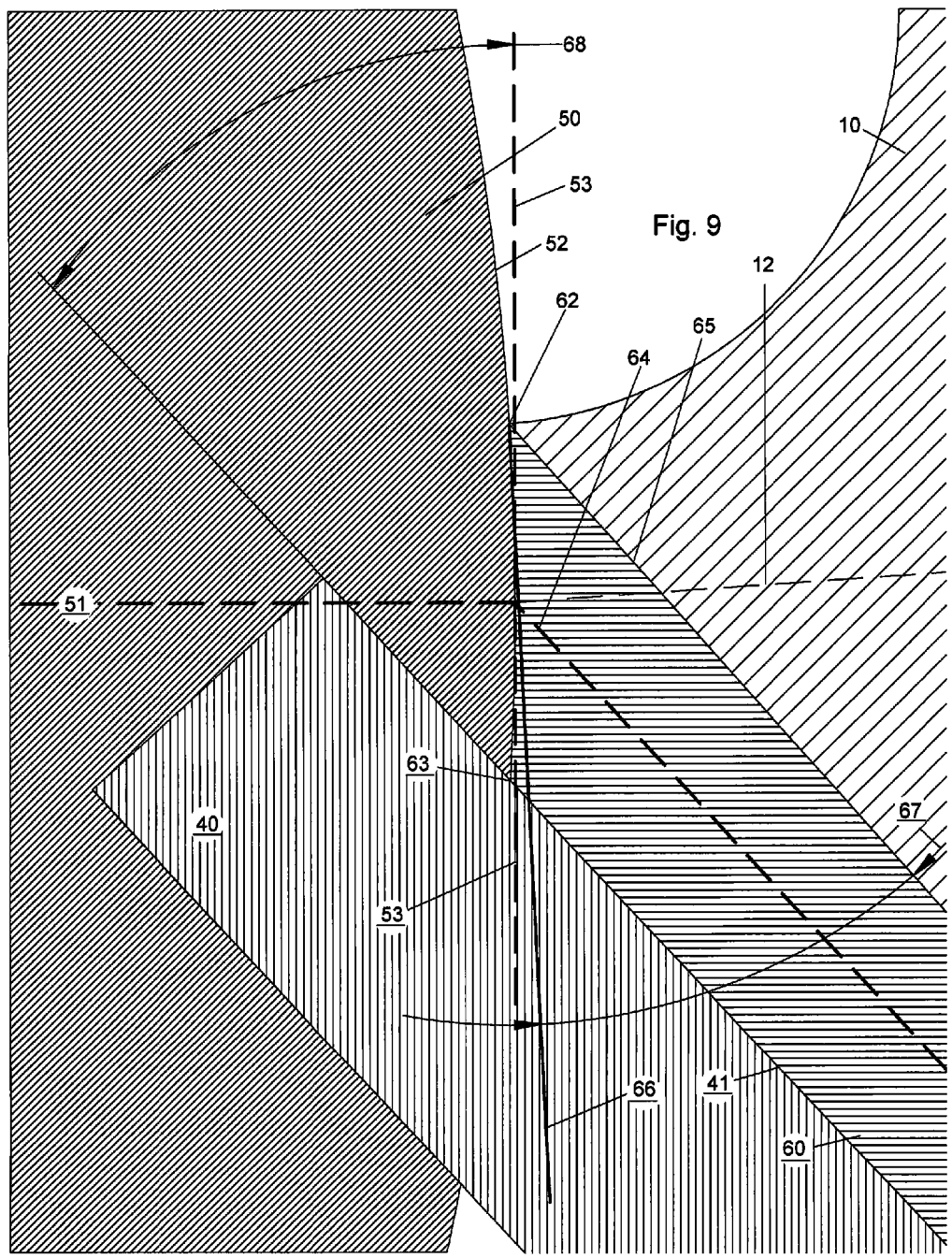
FIG. 9 (on Sheet 5) illustrates a close-up side view of a grinding platform 40 supporting a workpiece 60 in conjunction with a smaller diameter straight wheel 50 of a peripheral style grinder according to embodiments of the present invention.

FIG. 5 illustrates a side view of a grinding angle setup gauge 10 as used in conjunction with a tool rest platform 40 and a straight wheel peripheral grinder 50 with a smaller diameter abrasive cylinder. FIG. 6 illustrates a side view of the same grinder and tool rest platform with a workpiece 60 on the platform being ground. FIG. 7 illustrates a side view of a grinding angle setup gauge 10 as used in conjunction with a tool rest platform 40 and a larger diameter straight wheel peripheral grinder 80 with a larger diameter abrasive cylinder. FIG. 8 illustrates a side view of the same grinder and tool rest platform with a workpiece 60 on the platform being ground. FIG. 9 is a magnified side view of an arrangement of a smaller diameter grinding wheel 50 with its cylindrical surface 52, a tool rest platform 40, a workpiece 60, and a grinding angle setup gauge 10. FIG. 10 is a magnified side view of an arrangement of a larger diameter grinding wheel 80 with its cylindrical surface 82, a tool rest platform 40, a workpiece 60, and a grinding angle setup gauge 10. From these illustrations it can be seen that the same grinding angle setup gauge 10 that provides a precise setup angle when used in conjunction with a planar abrasive surface does not readily accomplish the same precision when used in conjunction with a cylindrical abrasive surface.

Operation of FIGS. 5 through 10

No commonly used preset angle gauge successfully defines the grinding angle in conjunction with cylindrical abrasive surfaces of varying diameters. This diametral variation is normal for sharpening woodworking tools as the grinding wheel is worn down by repeated use. The embodiment of the grinding angle setup gauge 10 shown in FIGS. 5 and 7 is nearly successful in accommodating curved abrasive surfaces of varying diameters.

For any of the preset angles of the gauge, the grinding angle setup gauge 10 should yield accurate and repeatable results. As illustrated in FIG. 5, for a desired angle of 40 degrees, the angle can be exact if the arcuate surface connecting the lower horizontal edge of the setup gauge's lower abrasive contact face 11 and the upper edge of the setup gauge lower abrasive contact face 14 has a surface curvature with a radius exactly the same as that of the abrasive cylinder 52. A similar arrangement for the same angle setting can be seen in FIG. 7, but in this instance the abrasive surface 82 has a larger radius and thus the area of interest on the setup gauge would also need to have a curvature of a larger radius. Thus, for the useful life of any straight peripheral grinding wheel; which starts its life at a maximum diameter and becomes progressively smaller; the present embodiment of the grinding angle setup gauge 10 with a preset curvature on the vertical edge of the setup gauge lower abrasive contact face 13 equal to that of the initial curvature of the grinder will start at a maximum of accuracy and become less accurate as the curvature of the radius of the grinding wheel diminishes. The following discusses the details of the angle gauge and how error is minimized over the useful life of the peripheral grinding wheel.

For the applications of greatest interest to this embodiment of the invention, grinding woodworking tools, an accuracy tolerance of plus or minus 0.5 degrees is generally acceptable. It is also necessary to have repeatability in the setting of the angle for grinding. This gauge satisfies both of these marketplace requirements.

An analysis of the details of the geometry of the workpiece to be ground can be seen by simultaneously examining FIGS. 9 and 10. A geometric analysis of FIG. 9 can be used to describe the setup procedure and results obtained by using this embodiment of the invention. For this example, we shall state that the grinder in FIG. 9 has a 5-inch diameter abrasive wheel 50. We shall also use a workpiece 60 that has a thickness 65 of 0.188 inches (the most common thickness of wood-turning edge tools) and a consequent thickness midline 64. The abrasive cylinder has a horizontal radius line 51. The setup gauge 10 has, for each designated angle facet, a centerline marker 12. The setup starts with the positioning of the tool rest platform at the approximate angle of interest which would be the desired wedge angle 67 of the ground end of the tool or workpiece 60. The vertical placement of the platform should be at an elevation which would position the workpiece 60 and the setup gauge 10 such that the setup gauge centerline marker 12, the workpiece midline 64, and the horizontal radius line 51 all intersect at the same point, which is coincident with the horizontal line created by the abrasive cylinder surface 52 and the vertical plane shown as an edge view represented by vertical tangent line 53. Next, the angle gauge 10 is placed vertically on the platform 41 so that the desired preset angle marker 12 is located closest to the angle to be set and the platform is moved so that the lower abrasive contact surface 13 is tight against the grinding wheel.

When this setup is done accurately, the dimensional analysis of FIG. 9 shows that the wedge angle 67 of the workpiece 60 in this example is 39.5 degrees. The wedge angle is the angle created by the upper surface of the workpiece 61 and the tangent line 66 at the location 62 for a workpiece thickness 65 which is actually 0.188 inches in this example. At the same time, the angle created by the intersection of the plane of the tool rest platform 41 with the vertical plane 53 is actually 42.5 degrees.

FIG. 10 contains the details of the same type of arrangement as is shown in FIG. 9 but with an example of an abrasive cylinder with a diameter of 8 inches. With the same platform 40 position and angle setting as the prior example, and with a workpiece 60 of the same thickness the dimensional analysis shows that the larger 8-inch diameter abrasive cylinder 80 results in a wedge angle 67 of 40.5 degrees. For comparison, the error commonly introduced by using the most common method of setting the angle of the grinding platform, using a protractor, is about 2.5 degrees.

Woodturners today know that certain types of tools require the wedge angle of the cutting edge to be a specific value. Those values vary depending on the specific tool type. Each type of tool, whether: bowl gouge, detail gouge, spindle roughing gouge, beading tool, parting tool, skew, or other tool; has an optimum wedge angle for the combination of the tool's task and the properties of the wooden workpiece (hardwood, softwood, burl). This setup gauge can include many, if not all, of the standard angles required for this array of tools. Woodturners also agree that the accuracy, repeatability, and reproducibility of the desired angles are acceptable if within a tolerance band of ±1 degree. This setup gauge used as described provides that.

From FIGS. 1 through 4 it can be appreciated that one feature of this embodiment of the invention is that each corner of the periphery of the setup gauge 10 is capable of setting more than one preset angle. This is possible because each of the angles that can be set by each peripheral corner of the setup gauge is complimentary and forms a right angle thereby including the complimentary angle and maintaining the square shape of the setup gauge.

A closer analysis of how the complimentary angles in the corners of the setup gauge actually work can be made by looking at FIG. 4 in conjunction with FIG. 9. From FIG. 4 it can be appreciated that the setup gauge's lower abrasive contact face's upper horizontal edge 14 does not makes contact with the planar surface 20 while setting angles against planar abrasive surfaces 20. This is possible because the curvature of the lower abrasive contact face 13 brings its upper horizontal edge 14 inward from the upper horizontal edge of the setup gauge's upper abrasive contact face 15.

FIGS. 11 through 15

FIG. 11 illustrates a side view of an embodiment of a setup gauge holder without a setup gauge 10. FIG. 12 illustrates an isometric perspective view of a setup gauge holder assembly. FIG. 13 illustrates an exploded isometric view of a setup blade holder. As seen in FIGS. 11, 12 and 13 this embodiment of an angle gauge holder comprises: a setup gauge holder body 70, a positioning shaft for setup gauge holder 71, setup gauge mounting screws 72, a clamping screw for a positioning shaft for a setup gauge holder 73, and washers 74. The positioning shaft for setup gauge holder 71 is secured to the setup gauge holder body 70 with the clamping screw for a positioning shaft for a setup gauge holder 73 and washers 74; however, the setup gauge holder can be secured to the positioning shaft for setup gauge holder 71 by any means common to the art. The setup gauge holder body 70 can then be secured to the setup gauge 10 with the setup gauge mounting screws 72 and a washer 74 forming the completed setup gauge holder assembly; again, the setup gauge 10 can be secured to the setup gauge holder assembly by any means common to the art. It will be appreciated that many variations of a solid or extensible setup gauge holder are possible.

FIG. 14 illustrates a left side view of an embodiment of a setup gauge holder assembly in conjunction with a generic adjustable tool positioning arm 75 and grinding wheel 30. FIG. 15 illustrates an isometric perspective view the same setup as illustrated in FIG. 14.

Operation of FIGS. 11 through 15

Woodturners use some tools which are most effectively sharpened in conjunction with a proximal end support structure such as that shown in FIG. 14 and FIG. 15. The tool is essentially supported by the adjustable tool positioning arm 75 at the tool proximal end and by the surface of the grinder 30 at the tools distal end. This simple arrangement usually requires several iterations of adjustment to attain the desired wedge angle for the sharpened edge.

When a setup gauge holder assembly is used to simulate the positioning of a tool as shown in FIG. 14, the wedge angle is obtained by using a somewhat similar procedure to that described for the use of a planar abrasive surface such as that shown in FIG. 3 or a curved abrasive surface as in FIG. 5. First, the length from the proximal end of the positioning shaft 71 to the upper horizontal edge 14 of the setup gauge lower abrasive contact face should be made equal to the overall length of the tool. Second, the setup gauge assembly, with the desired chosen sharpening angle appropriately positioned is placed in an adjustable tool positioning arm 75 in such a way that the proximal end of a gauge holder positioning shaft 71 abuts and is restrained by an adjustable tool positioning arm retaining bracket 76. Third, the adjustable tool positioning arm 75 should be clamped into place horizontally such that the lower horizontal edge of the setup gauge's lower abrasive contact face 11 and the upper horizontal edge of the setup gauge lower abrasive contact face 14 are in simultaneous linear contact with the curved abrasive surface 30. Fourth, the setup gauge assembly is removed and tool is ready to be ground.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An angle gauge, the angle gauge comprising:
   at least four flat exterior perimeter surfaces, wherein each flat exterior perimeter surface shares at least two corners with other flat exterior perimeter surfaces;
   wherein each corner between the flat exterior perimeter surfaces is capable of defining at least two angles between a first independent flat surface and either an adjacent second independent flat surface or an adjacent independent curved surface;
   wherein the angle determined by the corner is determined by which of the flat exterior perimeter surfaces of the angle gauge is placed flat against said first independent flat surface;
   wherein each corner about the perimeter of the angle gauge comprises at least two curved exterior peripheral surfaces that are capable of compensating for a curvature of said independent curved surface.

2. The angle gauge of claim 1, further comprising markings; wherein the markings define the angle to be determined by which of the flat exterior perimeter surfaces of the angle gauge is placed flat against said first independent flat surface.

3. The angle gauge of claim 1, wherein said curved exterior peripheral surfaces comprise compensation for workpiece thickness.

4. The angle gauge of claim 1, wherein said curved exterior peripheral surfaces comprise compensation for variations in the curvature of said adjacent independent curved surface.

5. The angle gauge of claim 1, further comprising an angle gauge holder.

6. The angle gauge of claim 5, wherein the angle gauge holder is capable of variable length.

7. The angle gauge of claim 5, wherein the angle gauge holder is capable of being supported by a telescoping receiver.

8. The angle gauge of claim 1, wherein the angle gauge is made of metal.

9. The angle gauge of claim 1, wherein the angle gauge is made of plastic.

10. A method for using an angle gauge comprising:
    locating a marking defining the angle to be set on an angle gauge;
    placing the angle gauge flat against a first independent flat surface such that said marking is closest to the vertex of a first independent flat surface and an adjacent independent curved surface; and
    moving the first independent flat surface so that the angle of the first independent flat surface and an adjacent independent curved surface is determined.

* * * * *